INVENTORS
HOWARD S. BEST
GEORG K. BUERGEL
BY Sughrue, Rothwell, Mion, Zinn & Macpeak
ATTORNEYS May 21, 1968 H. S. BEST ET AL 3,384,236

MACHINE FOR AUTOMATICALLY TESTING AND ORIENTING MINIATURE SEMICONDUCTOR CHIPS

Filed Aug. 31, 1966 10 Sheets-Sheet 2

May 21, 1968 H. S. BEST ET AL 3,384,236

MACHINE FOR AUTOMATICALLY TESTING AND ORIENTING MINIATURE SEMICONDUCTOR CHIPS

Filed Aug. 31, 1966 10 Sheets-Sheet 5

May 21, 1968 H. S. BEST ET AL 3,384,236

MACHINE FOR AUTOMATICALLY TESTING AND ORIENTING MINIATURE SEMICONDUCTOR CHIPS

Filed Aug. 31, 1966 10 Sheets-Sheet 9

3,384,236
Patented May 21, 1968

3,384,236

MACHINE FOR AUTOMATICALLY TESTING AND ORIENTING MINIATURE SEMICONDUCTOR CHIPS

Howard S. Best, Raleigh, N.C., and Georg K. Buergel, Plainview, N.Y., assignors to Corning Glass Works, Corning, N.Y., a corporation of New York Filed Aug. 31, 1966, Ser. No. 576,483
19 Claims. (Cl. 209—81)

This invention relates to a machine for automatically testing and orienting miniature semiconductor chips such as transistor chips and the like.

In the electronic arts, miniature electronic circuits are commonly formed on an insulating substrate (such as a ceramic) by "printed" conductors, transistors, resistors, and other miniature electronic components. The transistors used are miniature chips and must be carefully handled and precisely located relative to the conductors on the substrate. The machine of the invention accepts transistor chips at random, tests each chip to determine the orientation of its electrodes, rotates each chip as necessary so that all chips of a tested series are similarly oriented, then repeatedly tests each transistor chip for electrical characteristics (and possibly rejects it), and finally places each tested and oriented transistor chip into a circular magazine which safely stores a large number of such chips until they are ready to be used further, for example, until they are ready to be bonded to conductors on a substrate to make a complete circuit.

The chip is carried during the testing and orienting on the tip of a vacuum needle, and there are a number of such vacuum needles within a rotatably indexable turret. Test stations are positioned adjacent the periphery of the turret. As the turret is indexed adjacent each test station, a needle is extended radially from the turret to insert the chip into a test probe. Orienting is accomplished by rotating the chip carrying needle during rotary movement of the turret and after an orient test station, but before the first of several electrical test stations. Following each electrical test station is a reject station where electrically defective chips may be blown off the tip of the needle into a reject bin. After the electrical test and reject stations, the vacuum needle deposits the tested and oriented chip into a unique indexable circular magazine which is held in an ejecting magazine rack. The entire machine operation is automatic and electrically interlocked and controlled.

The foregoing and other features and advantages of the invention will be apparent from the following more particular description of a preferred embodiment of the invention as illustrated in the accompanying drawings.

*General assembly of the machine*

Figure 2:
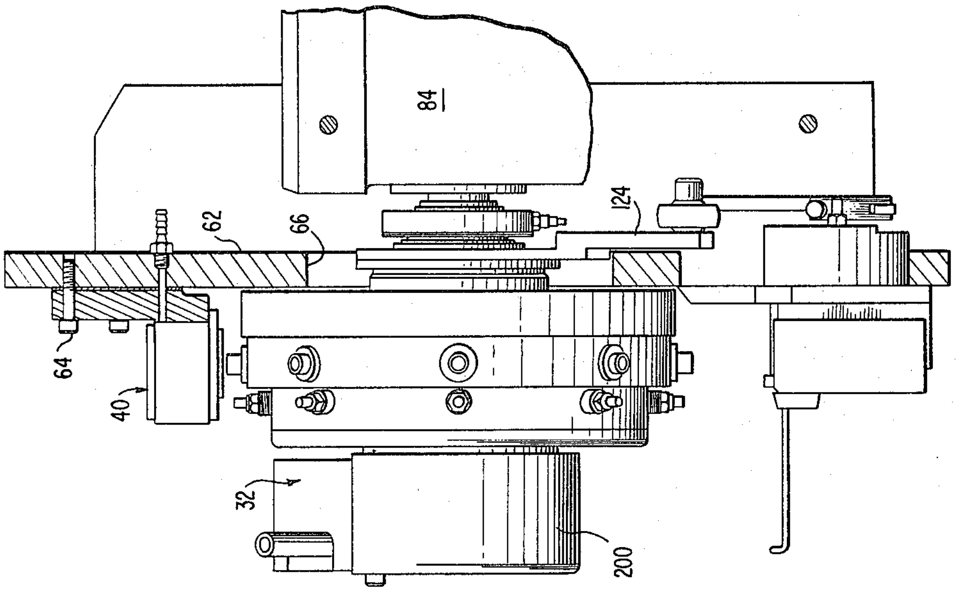
FIGURE 2 is a sectional elevation view taken partially on line 2—2 of FIGURE 1.
Figure 1:
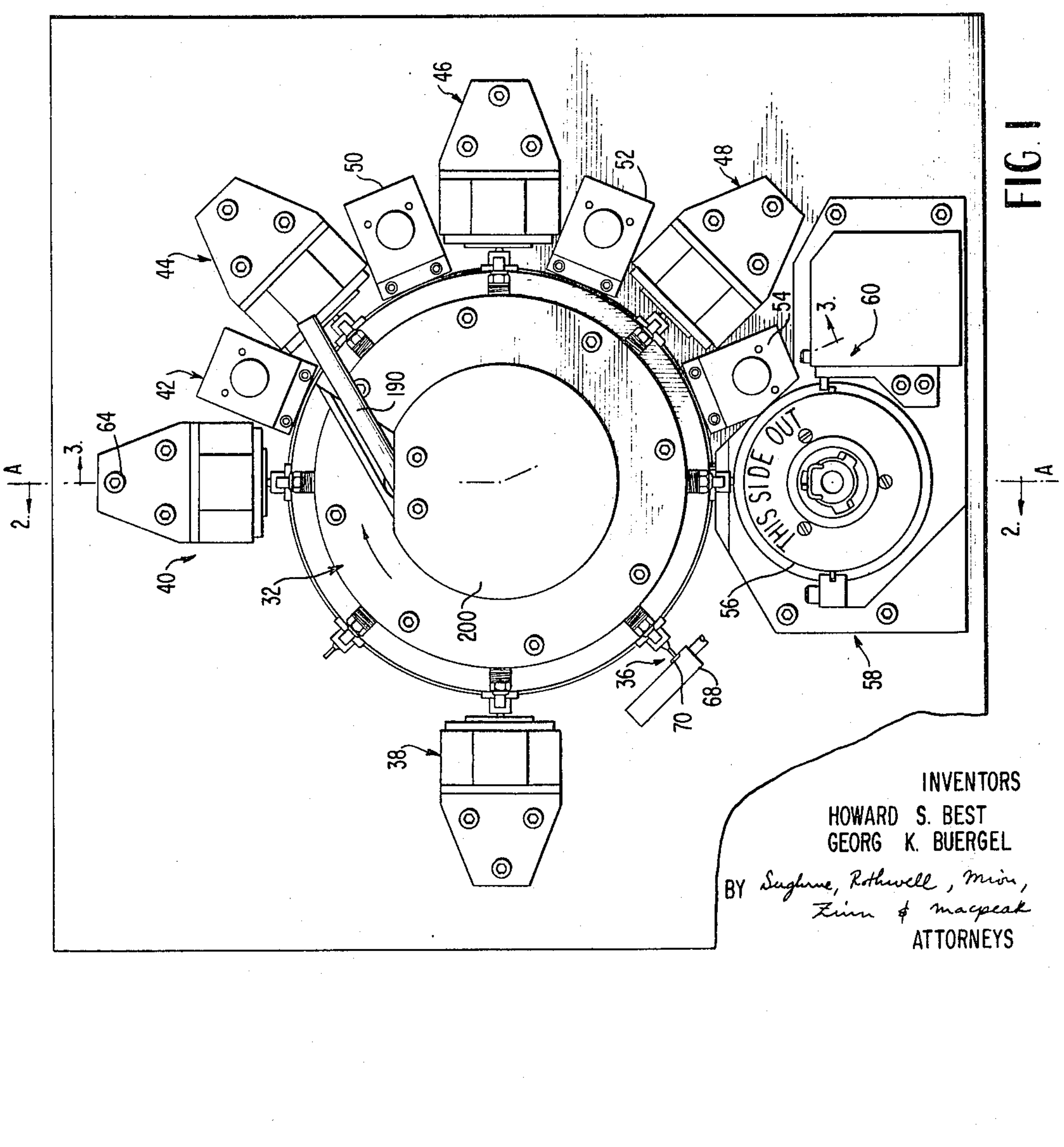
FIGURE 1 is a front elevation view of the automatic testing and orienting machine of this invention.
Figure 3:
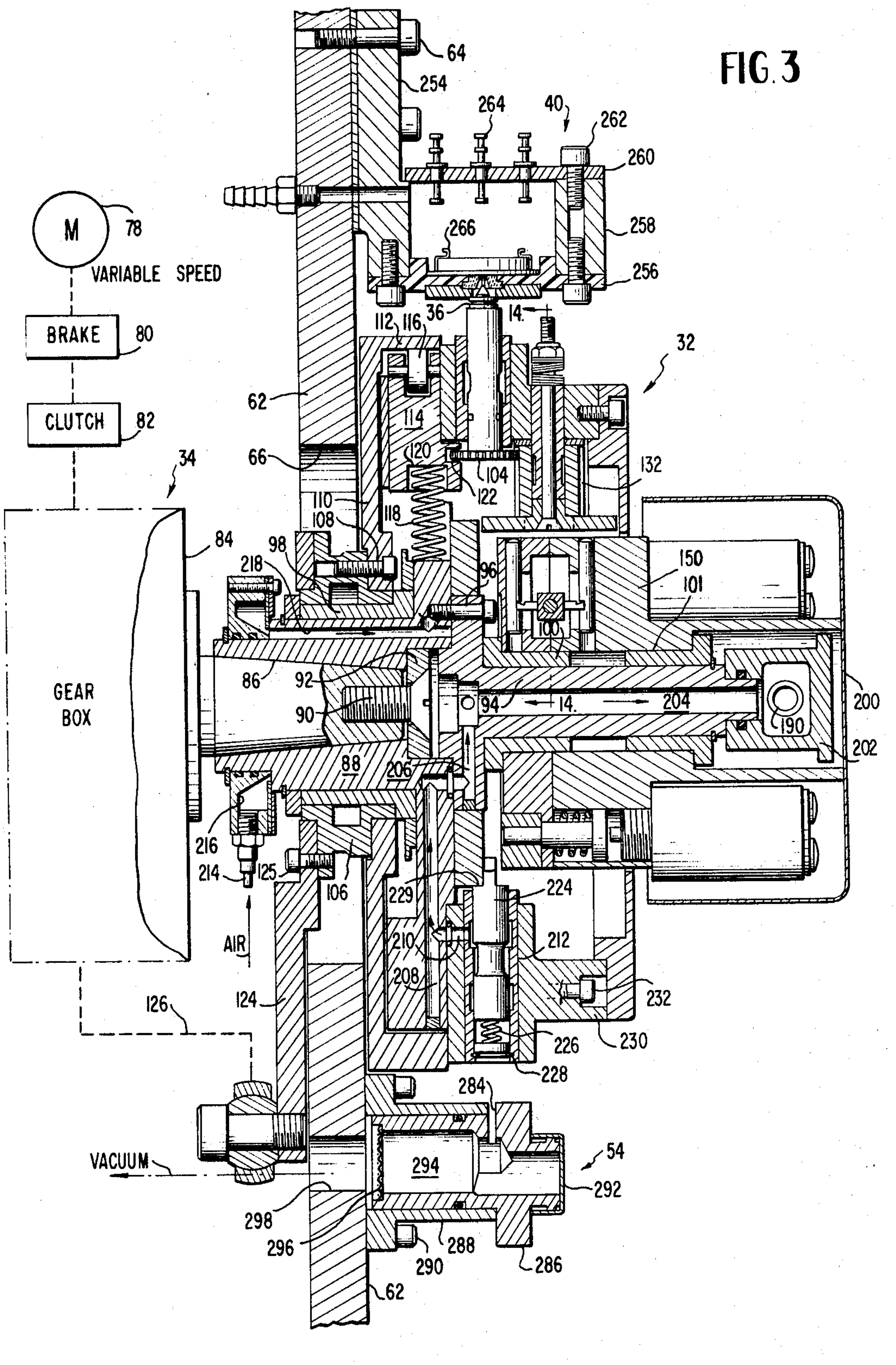
FIGURE 3 is an enlarged sectional view taken along line 3—3 of FIGURE 1 and showing certain drive mechanisms schematically.

The machine includes a turret assembly 32, FIGURES 1–3 which is rotatably indexably driven by a drive aggregate 34. The turret assembly includes a plurality of needle assemblies 36 (in the illustrated embodiment there are eight needle assemblies) and each needle assembly includes a hollow vacuum needle tip 37, see FIGURE 11, to which vacuum or air is applied. The needle tips at 37 are reciprocable along their axis and rotatable about their axis so that the needle tip can project outwardly during a dwell in the index movement and the needle may be rotated about its axis during rotation of the turret in its index movement.

Positioned around the periphery of the turret assembly 32 are a plurality of stations as shown in FIGURE 1. At the nine o'clock position, there is an orient probe 38 which is followed at the twelve o'clock position on the direction of rotation of the turret by an electrical test probe 40. At the one o'clock position following the test probe 40 is a reject bin 42 for holding any chips which have not met the electrical test. Additional test probes 44, 46 and 48 are positioned adjacent the periphery of the turret 32 and each is followed by corresponding reject bins 50, 52 and 54.

At the six o'clock position as viewed in FIGURE 1, there is a magazine 56 held in a magazine rack 58 and rotatably indexed by a magazine index mechanism 60. In this manner, acceptable tested and oriented transistor chips can be deposited in the magazine and the magazine is suitably indexed.

Figures 30, 31:
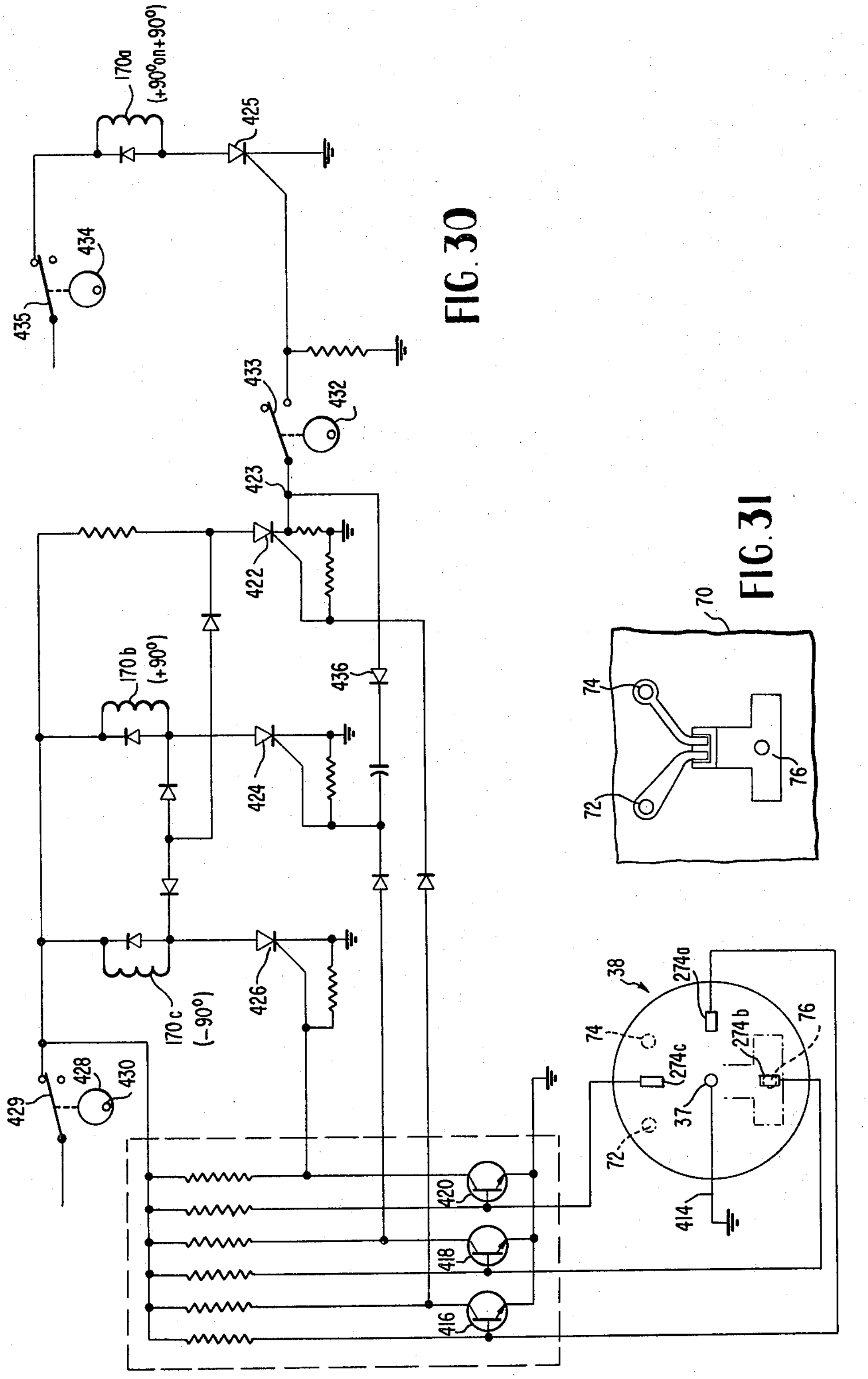
FIGURE 30 is an electrical circuit of a test probe for operation of orienting solenoids.
FIGURE 31 is a plan view of a typical transistor chip being tested.

The probes and reject bins are mounted to a stationary vertical support wall 62 by suitable screws 64 and the turret assembly 32 extends through a hole 66 in the wall. A feed tray 68 feeds a plurality of transistor chips 70, one at a time, to the turret midway between the six and nine o'clock positions so that these chips may be picked up by the vacuum needles 36. The chips 70 are shown in FIGURE 31, and may, for example, include three electrodes 72, 74 and 76, although there may be more electrodes in other forms of semiconductor devices. As the chips are fed on feed tray 68, the electrodes are on the face of the chip away from the tip of the needle 36 and turret 32 and are not oriented in any particular fashion. That is, although the electrodes are on one face of the chip the sides of the chip and hence the electrodes are randomly oriented. This machine tests to determine the orientation of the electrodes, orients the chip so that all of the electrodes are similar and electrically tests the chip for electrical characteristics and deposits oriented and electrically acceptable chips in the magazine 56 all under interlocked control.

*Turret drive*

The rotatably indexable drive of turret assembly 32 is under the control of a variable speed motor 78, FIGURE 3, which drives through a brake 80 and clutch 82 to an indexing gear box 84. Extending from the gear box is a drive shaft 86 which mates with a driven turret core 88 and is drivingly connected thereto by screw 90 and plate 92. Therefore indexing drive from gear box 84 causes the turret core 88 to correspondingly rotatably index. Rigidly attached for movement with core 88 is a solenoid carrier 94 which is secured thereto by screws 96 extending through a flange of the carrier 94 into the core 88. A bearing ring 98 is positioned around the midpoint of the turret drive core 88 and other similar bearing rings 100 and 101 are positioned around the solenoid carrier 94.

*Needle control mechanism*

As mentioned above, each of the needle assemblies 36 are reciprocated longitudinally relative to its axis and rotated relative to its own axis. The apparatus for reciprocating the needle assemblies 36 longitudinally utilizes the needle carrier 102, FIGURE 11, which houses the tip 37 of the needle assembly 36. At the lower or inner end of the carrier 102 is a pinion 104.

On the bearing ring 98 is movable ring 106, FIGURE 3, which is attached by means of screw 108 to an inside cam 110. The inside cam includes a flange 112 with the inside cam surface 113 thereon, FIG. 4. Cooperating with the inside cam surface is a cam follower 114 having a cam follower roller 116 journalled therein and biased into engagement with the cam by a spring 118 seated on the turret core seat 119 and in seat 120 in the cam follower 114. A notch 122 is provided in the edge of the cam follower 114 adjacent the pinion 104 and the pinion protrudes into this notch. It can thus be seen that movement of the cam follower 114 radially under the influence of the cam surface 113 will cause movement of the pinion 104 radially and hence longitudinal movement of the needle assembly 36.

Figures 4, 5, 6:
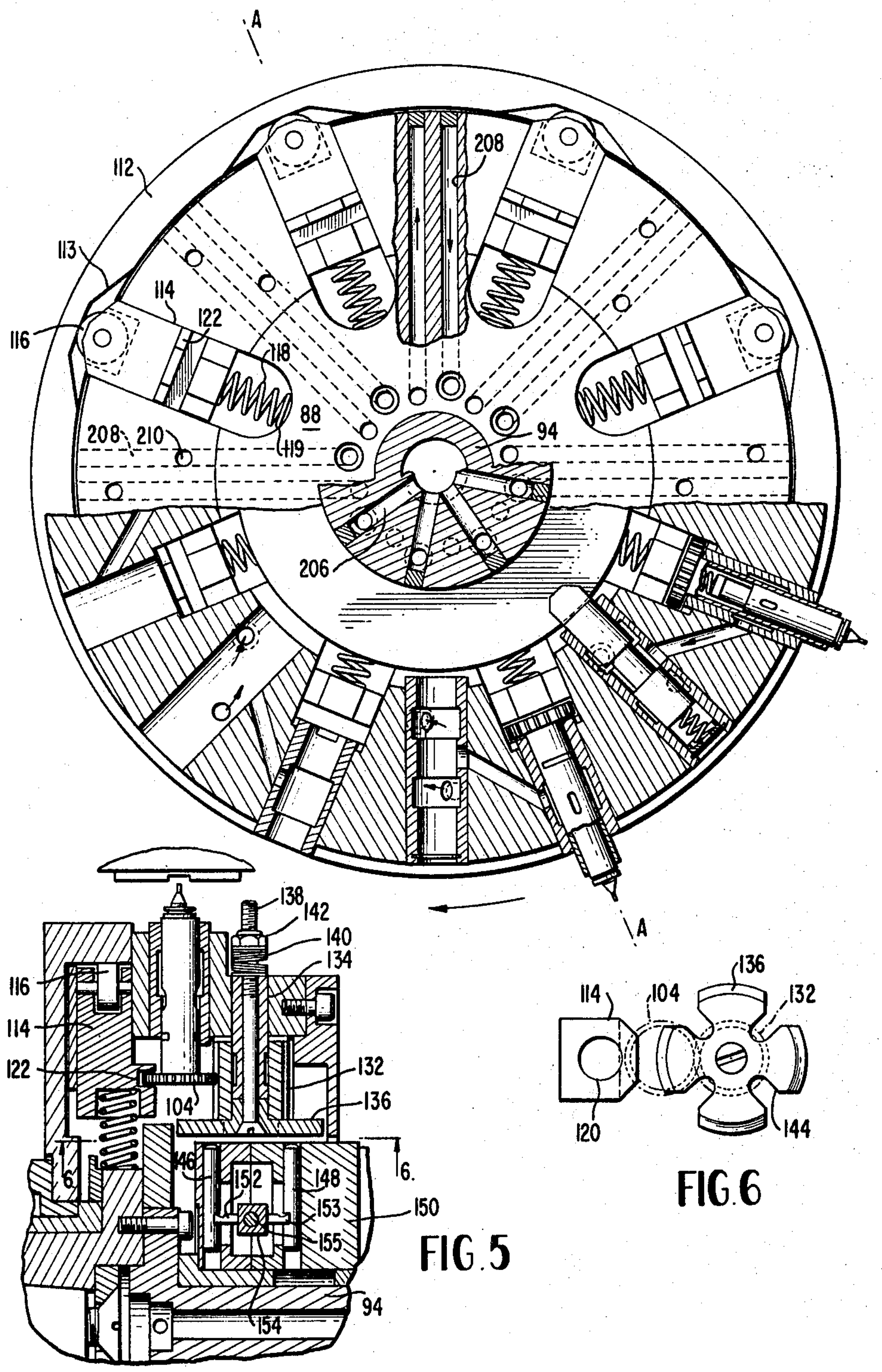
FIGURE 4 is a transverse sectional view of the turret rotated slightly from the FIGURE 1 position.
FIGURE 5 is a longitudinal sectional detailed view illustrating means for rotating and reciprocating a vacuum needle.
FIGURE 6 is a view taken along line 6—6 of FIGURE 5.

In order to rotate the cam 110 there is provided a cam actuating lever 124, FIG. 3, secured by screw 125 to the movable ring 106 and intermittent actuation is provided from gear box 84 through a suitable mechanical linkage 126. At the cam position shown in FIGURES 3 and 4 with the narrow part of the cam flange 112 cooperating with cam follower roller 116, the needle tip 37 is projected outwardly by spring 118. When the thick part of the cam flange contacts the cam follower roller 116 as shown in FIGURE 5 the spring 118 is compressed, the cam follower notch 122 pulls the pinion 104 and hence the needle assembly 36 radially inward to retract the needle tip in order to clear the stationary probes around the periphery of the needle. The retraction is under positive control of the cam while extension of the needle tip 37 is under the bias of cam follower spring 118.

*Needle assembly*

Figure 11:
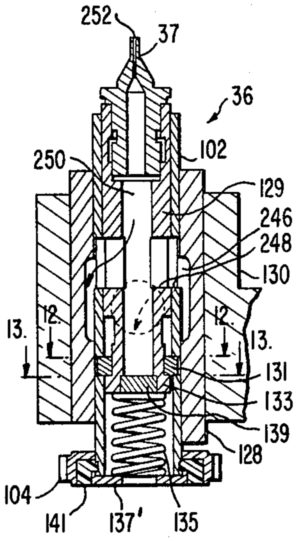
FIGURE 11 is a sectional detail view of a needle assembly.

Needle assembly 36 includes a bearing 128, FIG. 11, carried within member 130 which rotates on a horizontal axis with the turret. The bearing 128 allows the needle carrier 102 to reciprocate axially as well as to rotate about the axis of the needle 36. A needle tip holder 129 is mounted in needle carrier 102 for easy removal. A retaining member 131 on the carrier 102 cooperates with split flanges 133 on the holder 129 to retain the needle against the bias of spring 135 seated on cap 137. However, to remove the needle tip 37 and holder 129, they need only be rotated 90° with respect to carrier 102 and member 131 from that shown so that the flat portion 137' of the flange 133 clears the member 131, and spring 135 assists in ejection of the needle. The needle end is plugged by plug 139 so as to retain pressure or vacuum applied to the needle at the needle tip. A resilient washer 141 interconnects the carrier 102 and pinion 104 for shock absorbing purposes.

*Needle axial rotation control for indexing*

The pinion 104 is also utilized to rotate the needle assembly 36 about its axis; this rotation being necessary and desirable to rotate a transistor chip such as chip 70 shown in FIGURE 31 to orient the electrodes thereof relative to the following electrical test stations and to the receiving magazine. Rotation of needle assembly 36 is accomplished by pinion 104 engaging needle indexing gear 132, see FIGS. 3 and 5. Needle indexing pinion 132 in turn is positioned around shaft 134 which carries a mutilated wheel 136 on its lower end. This wheel functions as a portion of a Geneva indexing mechanism for indexing shaft 134 and gear 132 through a predetermined angle in order to rotate the needle assembly 36 in two steps, the first being plus or minus 90° and the second step being plus 90°. In this manner, a transistor chip carried by the needle tip 37 may be tested at the nine o'clock position and rotated either plus or minus 90° as required during the next 45° rotation of the turret, and if a 180° rotation is required for orientation, the chip is rotated another plus 90° during the next 45° of rotation of the turret.

A shock absorber or brake arrangement is provided by the central screw 138 which goes through shaft 134 and resilient washers 140 which are forced downwardly by nut 142 in order to provide a desired frictional connection between the gear 132 and the shaft 134.

Referring to FIG. 6, the slots 144 in the mutilated gear 136 are provided to be engaged with pins which are projected upwardly from a pin block 150. Block 150 is stationary during rotation of the turret and hence is stationary during rotation of the entire assembly including mutilated gear 136 about a horizontal axis. When a pin is selectively projected radially outwardly to engage one of the slots 144 in a mutilated gear 136, the pin being stationary will hold the gear relatively stationary while the entire movement about the horizontal axis of the turret will cause rotation of the mutilated wheel 136 and of the gear 132 to thereby rotate the needle assembly 36.

There are three pins which are selectively projected from block 150 in order to cause the indexing movement. Pins 146 and 148 are alternately operated depending upon whether plus or minus 90° orientation is desired in the first 45° of travel of the turret from the nine o'clock position. If a further 90° of orientation is desired to provide 180° rotation of the chip carried by the turret, a further pin 174 is projected from the block 150 after 45° of rotation from the nine o'clock position.

Figures 14, 15, 16:
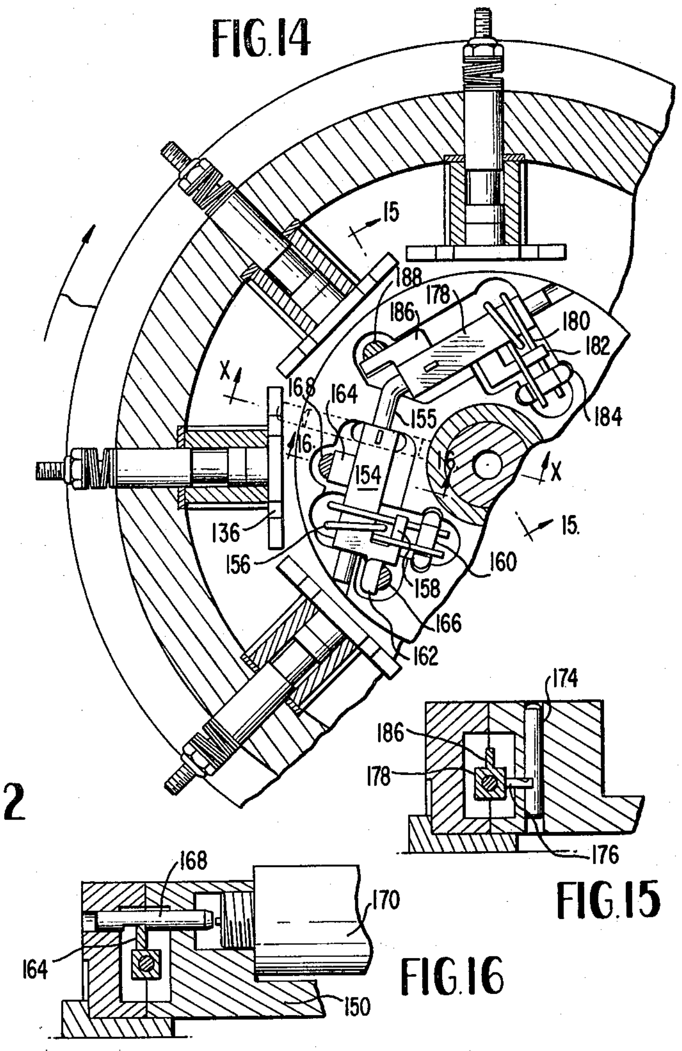
FIGURE 14 is a transverse partial sectional view taken along line 14—14 of FIGURE 3 showing the mechanism for rotating the needles.
FIGURE 15 is a sectional view taken along line 15—15 of FIGURE 14.
FIGURE 16 is a sectional view taken along line 16—16 of FIGURE 14.
Figure 12:
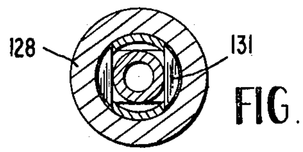
FIGURE 12 is a sectional view taken along line 12—12 of FIGURE 11.
Figure 13:
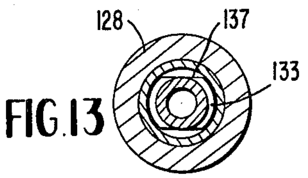
FIGURE 13 is a sectional view taken along line 13—13 of FIGURE 11.

The mechanism for projecting pins 148, 146, 174 and the pins themselves are illustrated in FIGS. 5, 14, 15 and 16. The pins 146 and 148 are engaged by arms 152 and 153, respectively, which arms extend from member 154 rotatably supported on shaft 155. A spring 156, FIG. 14, wound around member 154 is provided to normally hold the pins in the retracted position as shown in FIG. 5. The spring contacts tang 158 extending from member 154 and is referenced on lug 160 within the block 150. Also extending from the surface of member 154 are lugs 162 and 164 which in turn are contacted by operating rods 166 and 168, respectively. Operating rod 168 is shown in FIGURE 16 and it in turn is moved axially under the control of solenoid 170. For example, energization of solenoid 170 will move operating rod 168 to the left as viewed in FIGURE 16 rotating member 154 counterclockwise as viewed in FIGURE 16 and causing arm 153 to project pin 148.

In a similar manner, pin 174 as shown in FIGURES 14 and 15 which follows the location of pins 146 and 148 may be projected from block 150 by arm 176 attached to member 178 which in turn is also rotatable on shaft 155. In a manner similar to that discussed above, spring 180 normally biases the pin 174 to retracted position by contacting tang 182 on member 178 and being referenced in lug 184. A tang 186 projecting from member 178 is contacted by the solenoid operating rod 188 in a manner similar to that shown in FIGURE 16.

*Vacuum and pressure application to needle tip*

A source of negative pressure or vacuum is applied to the turret and selectively applied to the needle tip 37. This vacuum is applied through line 190, FIG. 1, which enters through solenoid housing 200 and coupling 202 so that the vacuum may be applied through axial passage 204 in solenoid carrier 94, FIG. 3. The vacuum passage extends radially outward through passage 206 and carrier 94 and then further radially outward through passage 208 in the turret core 88. A vacuum port 210 connects vacuum passage 208 with a valve body 212.

Figures 7, 8, 9, 10:
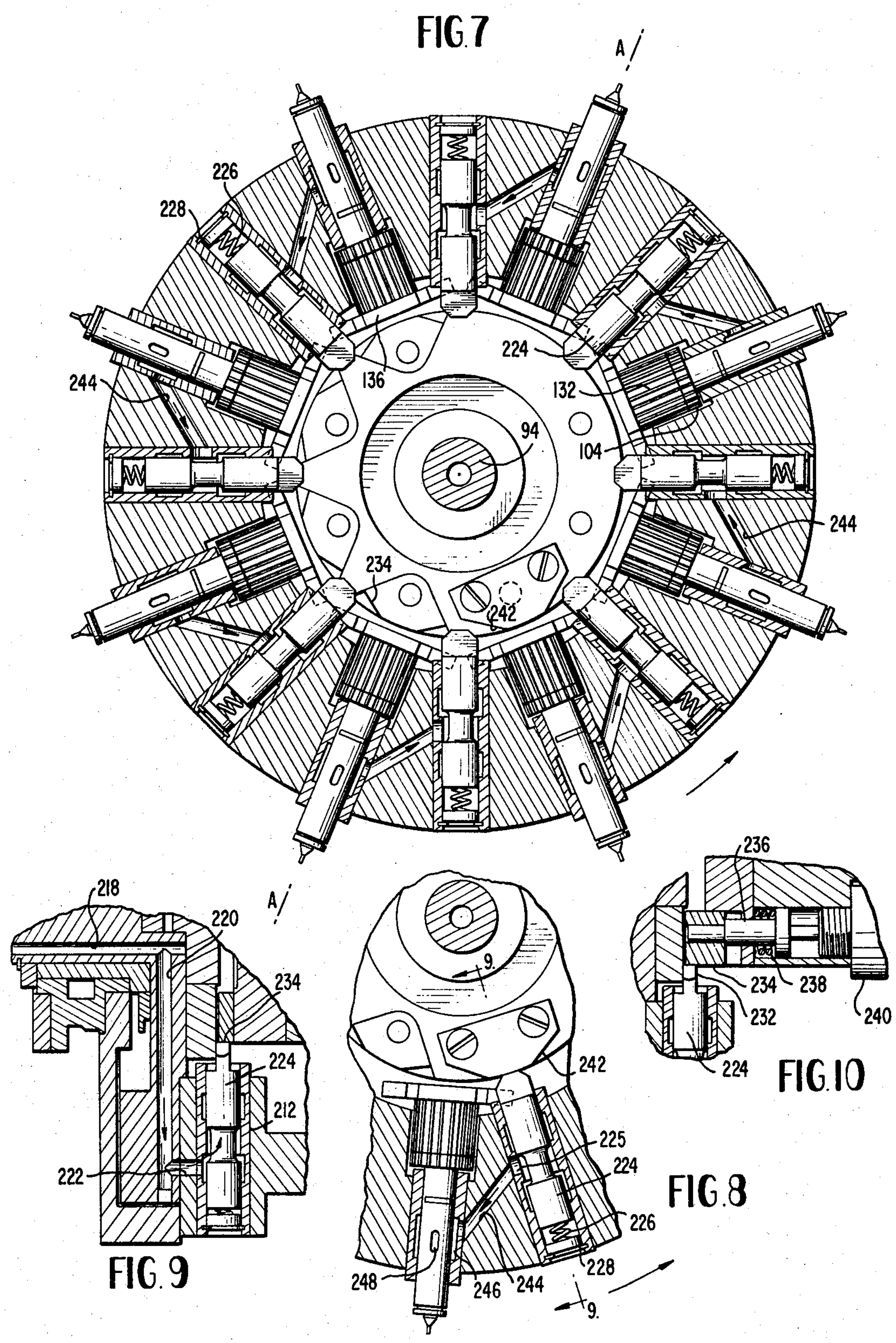
FIGURE 7 is a transverse sectional view similar to FIGURE 4 only viewed from the opposite side of the turret.
FIGURE 8 is a detailed transverse sectional view of an air-vacuum valve and passage in the turret.
FIGURE 9 is a longitudinal sectional detailed view of the air passage taken along line 9—9 of FIGURE 8.
FIGURE 10 is a longitudinal detail similar to FIGURE 9 but taken at a different position on the solenoid operated cam.

In a somewhat similar manner, a source of positive pressure, such as air under pressure, is applied through air inlet 214 and through a rotary fluid coupling 216 from whence it passes through passageways 218, FIG. 3, extending axially in the turret core 88 and then radially outward through separate passages 220 which have a pressure port 222 also connecting into the valve body 212, FIG. 9. The valve body 212 has a reciprocable valve member 224 therein for controlling the application of pressure from port 222 or vacuum from port 210 through an outlet port 225, FIG. 8. The valve is of the spool valve type and a valve spring 226 is provided between the valve member 224 and a spring cap 228 for biasing the valve radially inwardly. When normally biased inwardly, the bottom of the valve rests on ledge 229, FIG. 3, and the valve outlet 225 is connected to vacuum through vacuum port 210. This is the normal condition in which vacuum would then be applied to the needle tip to hold the transistor chip thereon. There are times, however, when it is desired to blow the chip off the needle tip. This would be when an electrical test has shown the chip to be defective. Also, after a chip is deposited in the magazine at the six o'clock position, the needle tip is cleared by blowing positive pressure out of the needle tip prior to the application of vacuum to pick up the next chip from feed tray 68. In order to provide positive pressure to the needle tip for chip rejecting a cam, such as cam 234, FIG. 10, is projected into the path of a cam follower tip 232 on the end of valve member 224. Movement of the turret carrying valve member 224 relative to stationary projected cam causes tip 232 to engage cam 234 and this forces the valve member radially to move the valve to the position shown in FIG. 9.

Cam 234 is carried on the end of reciprocating member 236 and is normally biased to a retracted inoperative position by spring 238 but may be projected to the valve intercepting position shown in FIG. 10 by a solenoid 240. When the cam is so projected, it causes positive pressure to be applied to the valve outlet port 225. As shown in FIG. 7, there is a cam 234 for each of the reject stations 42, 50, 52 and 54. In addition, there is a fixed cam 242 for a needle clearing position.

The valve block and needle block have a valve outlet passage 244 leading to a recess 246 in the needle bearing 128 and this recess cooperates with a slot 248 in the movable needle carrier 102. The inside of the movable needle carrier assembly includes an axial passage 250 relative to the needle in fluid communication with a needle tip passage 252 so that either pressure or vacuum at the valve outlet passage 244 may be applied to the needle tip as required during the cycle.

*Probe stations*

The probes 38, 40, 44, 46 and 48 for testing the transistor chip carrier and the end of the needle are all identical with the exception of electrical connections. A typical probe is that shown in the top of FIG. 3 and a probe shown in more detail in the sectional view of FIG. 17. As shown therein, the probe includes a housing support 254 to which is secured an inner housing member 256, a housing side 258 and a housing top 260 all by suitable screws 262, as required. The housing top has suitable terminals 264 for electrical connections. In the case of the test stations 40, 44, 46, 48, these connections lead to a commercially available test machine while in the case of the test for orient station 38, the electrical connections are shown in the electrical circuit dragram. The inner end of the terminals 264 are connected to probe wires 266 by conductors (not shown) and these probe wires are carried by removable probe plate assembly 268. Probe plate assembly 268 includes plate 269 and plate 270 secured by screw 271. Probe plate assembly includes a central opening 272 into which tip 274 of a probe wire is suitably positioned relative to the transistor chip 70, as will be explained with reference to FIGS. 30 and 31. There may be several probe tips 274, for example, three for a three electrode transistor chip 70. A ceramic guide and bearing plate 276 have a frusto pyramidal opening 278 directed radially toward the turret and a square opening 280 approximately the same size as the square transistor chip 70 allowing, of course, for slight tolerance so that the chip can be inserted on the tip 37 of the needle assembly 36. An outside guard plate 282 may be provided to guard the ceramic guide 276.

The transistor chip 70 carried by the needle tip 37 may be inserted into the guide until it contacts the ends 274 of the probe wires and these proble wires electrically signal the orientation of the electrodes of the transistor chip. The signals are utilized to control the rotation solenoids and thereby control rotation of the chip for orientation between the test for orient station at nine o'clock and the first electrical test station at twelve o'clock.

As noted above, the electrical test probe stations are identical with the exception of the connection from the probe station which is through an electrical test machine of a commercially available type. The results of the electrical test on the transistor chip are fed back into the turret to control the solenoids 240 operating cams 234 to apply air pressure as desired to blow the transistor chip 70 off the tip of the needles as they pass the reject bins 42, 50, 52 and 54 on the fly.

*Reject bin assembly*

The reject bins are quite simple and are all identical. the lower half of FIG. 3 shows reject bin 54 in section. The reject bin includes a slot 284 wide enough to receive the square transistor chip 70 carried on the needle tip 37. This slot is in housing member 286 which in turn is carried by receptacle 288 secured to vertical wall 62 by suitable screws 290. A cap 292 closes the outer end of the reject bin which is formed by cavity 294 in member 286. A screen 296 is provided at the inner end of bin 294 and vacuum is applied through connection 298 to the cavity 294 so that as the needle tip 37 carrying a transistor chip of the tip thereof passes through slot 284 on the fly, it will pass through the slot 284 and will be retained on needle tip 37 unless the electrical test at the preceding test station has indicated that the transistor chip is defective, in which case the appropriate solenoid 240 will be energized to place appropriate cam 232 in the path of corresponding air valve member 224 applying air to the inside of needle tip 37 at the precise time that the needle tip is moving through slot 284. This blows the chip into the bin 294 and vacuum holds the chip in the cavity 294 until the bin is ready to be emptied by removing member 286.

There are four identical test probe stations and four identical reject stations thus allowing the transistor to be tested for four different electrical characteristics and possibly be rejected for any one of these four. There may, of course, be a greater or lesser number of electrical test stations and reject stations or bins within the scope of this invention.

*Construction of the magazine*

The magazine 56 is best shown in FIGS. 22 through 28, inclusive. The magazine includes a back member 300 and a cover member 302. The back member has a hub 304 with helical splined slots 306 therein. The cover member 302 has a flange 308. A pin 310 is secured to the back member and is utilized to hold the magazine 56 in reference position while a pin 312 is secured to the cover member 302 and is utilized for indexing purposes. Within a cavity formed by the inside surfaces of the back 300 and cover 302, there is a toothed chip carrier 314 capable of carying chip 70 in a space 316 between its teeth and the inside surface of flange 308. Spaced radially inwardly from the annular tooth chip carrier 314 are a pair of transversely split gears 318 and 320. Split gear 318 includes a pin 322 and similarly, split gear 320 includes a pin 324. These pins extend into larger sized openings 326 and 328, respectively, in the gear adjacent the one which holds the pin. A spring 330 held by ring 332 biases the split gears 318 and 320 in frictional engagement.

A spring pawl 334 in a cavity 336 in chip carrier 314 has a finger 338 cooperating with ratchet teeth 340 on the periphery of both split gears 318 and 320. A number of springs 342 are in receses 344 spaced about the periphery of the gears 318, 320, for biasing the gears to a normal position, FIG. 22.

A screw 346 is threaded through cover 302 into split gear 320 to secure the gear to the cover and a screw 348 is threaded through the back 300 into gear 318 to secure this gear to the back. Hence, when the cover 302 is moved relative to the back 300 by means of moving pin 312 while holding pin 310, gear 320 will move a short distance relative to gear 318. Since teeth 340 on the periphery of the gears are engaged by pawl tooth 338, and since pawl 334 is positioned to allow the gear teeth 340 to slip by it, no movement will be imparted to the chip carrier 314, see FIGS. 22, 23.

As the indexing drive force on pin 312 is removed, springs 342 attempt to bring the split gears 318 and 320 back to the original position (from FIG. 23 back to FIG. 22 position) which in turn causes the cover 302 connected to gear 320 to return to its original position. The teeth 340 on gear 320 will be drivingly engaged by pawl 334 carried in chip carrier 314, so that return movement of gear 320 will cause indexing of the chip carrier 314 an angular distance equal to one tooth and in the direction of the arrow in FIG. 24.

Figure 28:
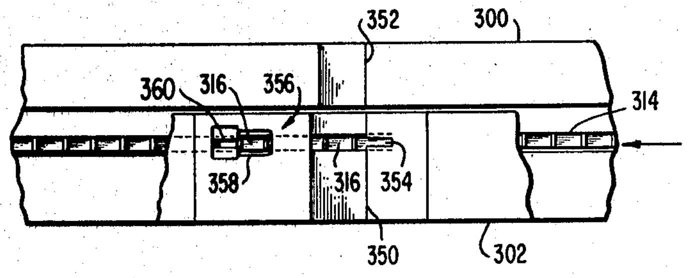
FIGURE 28 is an enlarged view looking in the direction of line 28—28 in FIGURE 22.

This indexing movement of the chip carrier 314 and the return movement of the cover 302 only is utilized to capture the chips in the slot arrangement shown in FIG. 28.

In this arrangement, both the cover 302 and back 300 have transverse slots 350 and 352, respectively. In addition, the cover flange 308 has a removal slot 354 overlying the teeth spaces 316 of the chip carrier 314. The width of the removal slot 354 is wider than the tip 37 of the needle but narrower than the width of the transistor chip capturing space 316 and also narrower than the square chip 70. Hence, for removal operations (not performed with the machine of this invention but performable with the magazine of this invention), a needle 37 is inserted into slot 354 and suction is applied. The magazine is indexed one space equal to the width of space 316 and the slot 354 appears as shown in FIG. 28 with the chip exposed for removal. However, as long as it is under the slot 354, it is not removed.

In addition to slot 354, there is a keyhole-shaped slot 356 in the cover on the other side of groove 350 and this slot includes a large sized opening 358 and a narrow stripper ledge 360. The width of the stripper ledge 360 is slightly greater than the width of the needle tip 37. The length and width of slot portion 358 is larger than the size of the transistor chip 70. In this manner, the needle assembly 36 with a transistor chip 70 held by vacuum on tip 37 can move axially and therefore radially outward of the turret of the six o'clock position, place the transistor chip in a space 316 which lies below the slot 358 and the cover 302 is then indexed to move the stripper ledge 360 over space 316 where the needle has positioned chip 70, the stripper ledge passes the needle and over the transistor chip. At this time, the needle is retracted and the underside edges of the stripper ledge 360 hold a transistor chip down so that it may be retained in space 316 of the chip carrier 314 as the cover 302 returns to its normal position carrying the chip carrier 314 along with it. The operation is repeated until almost all of the slots 316 of the carrier 314 are filled, then the full magazine 56 is removed and another magazine is automatically inserted.

*Magazine rack index mechanism and eject control*

Figure 18:
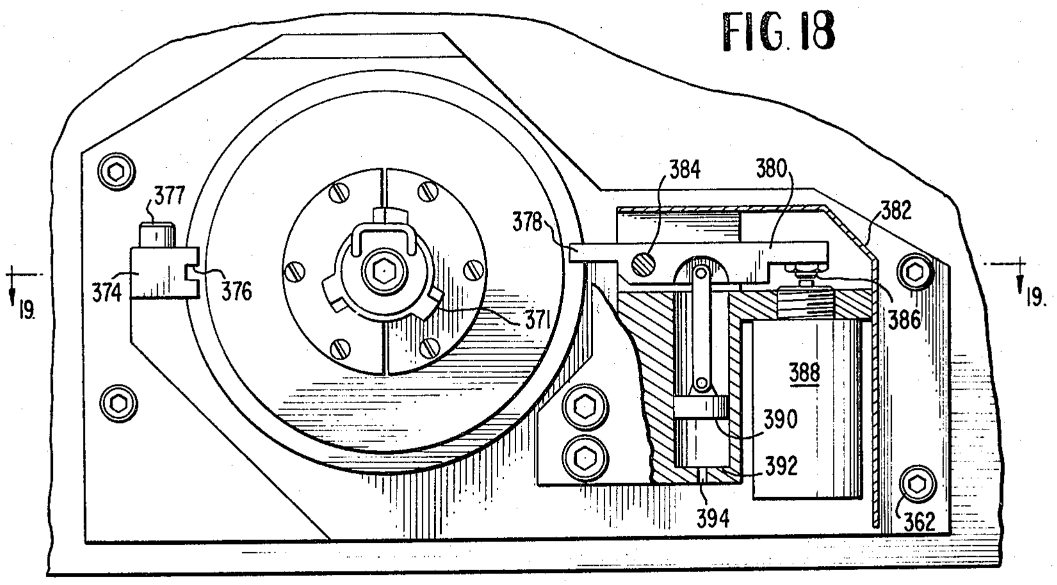
FIGURE 18 is a front elevation view of a magazine holder shown partially in section.
Figures 19, 20, 21:
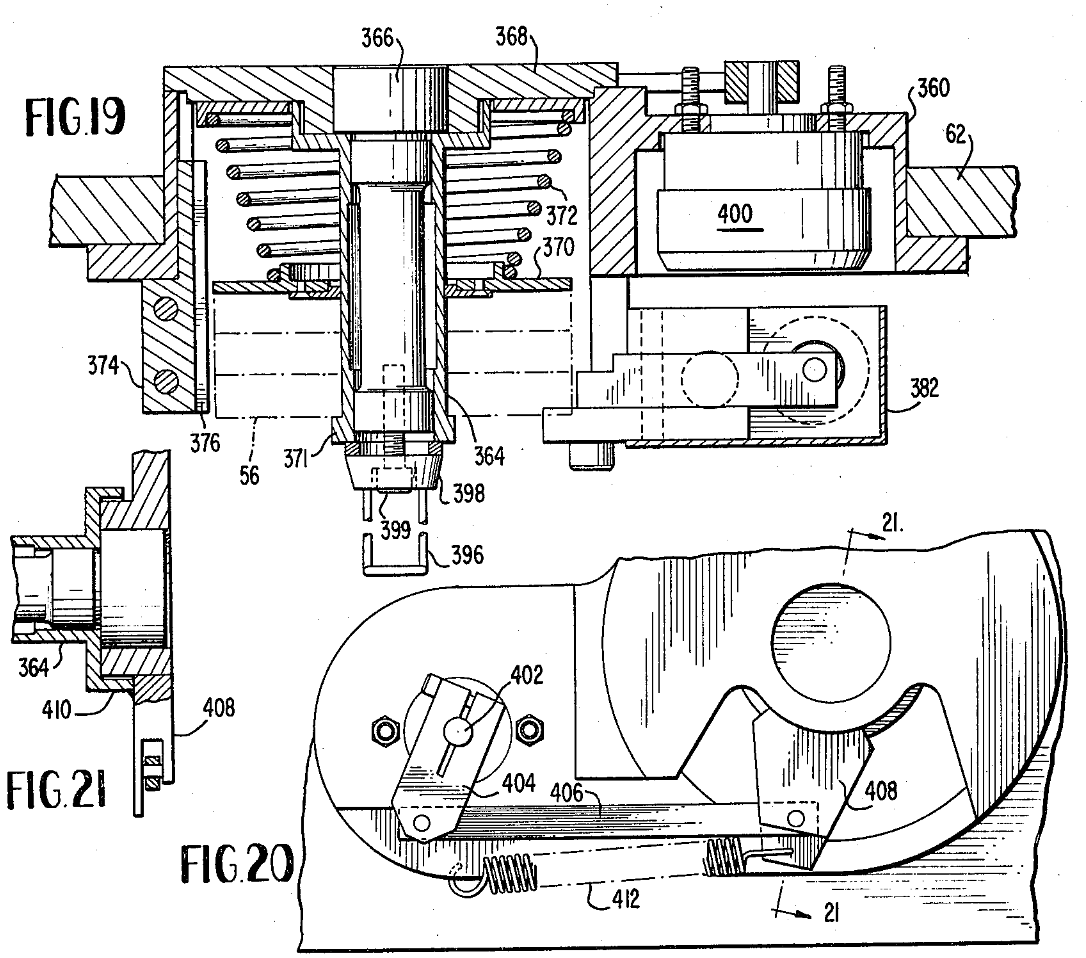
FIGURE 19 is a sectional view taken along line 19—19 of FIGURE 18.
FIGURE 20 is a rear partial elevation view of the magazine holder assembly shown in FIGURE 18.
FIGURE 21 is a sectional view taken along line 21—21 of FIGURE 20.
Figure 22:
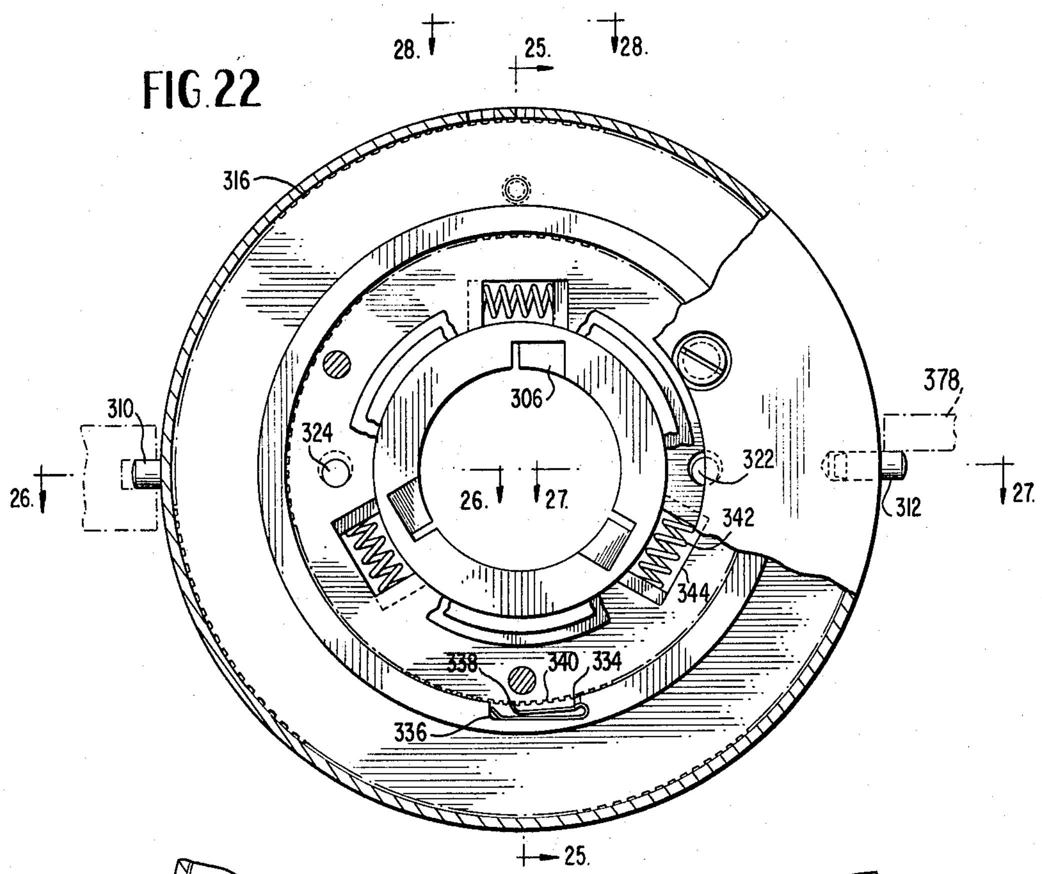
FIGURE 22 is a front elevation view of the magazine of this invention with the cover removed and portions shown in section for the sake of clarity.
Figure 23:
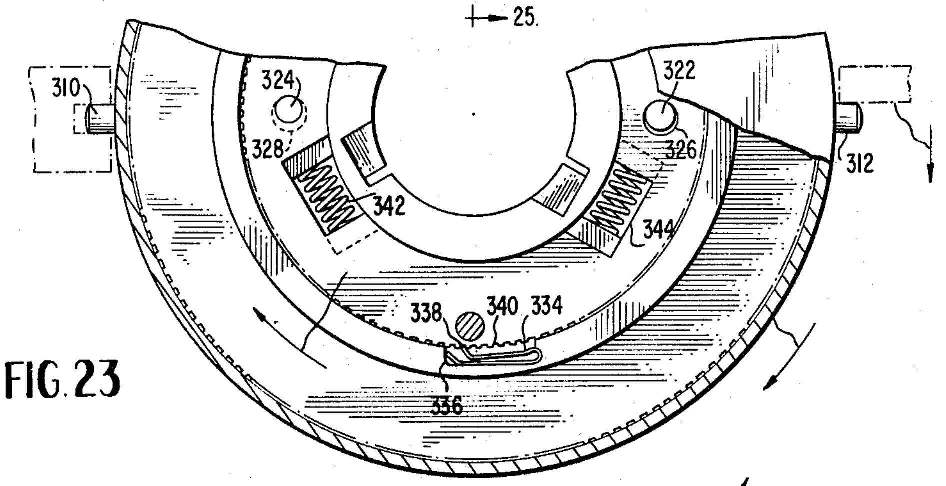
FIGURE 23 is a partial view of the magazine of FIGURE 22 during indexing movement.
Figure 24:
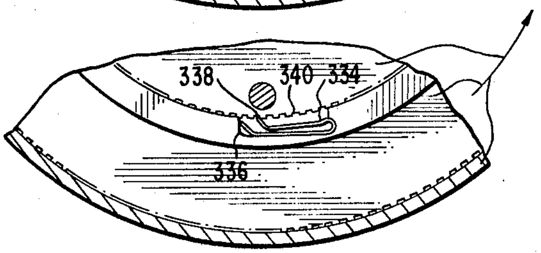
FIGURE 24 is a partial view of the magazine of FIGURE 22 shown during a further portion of the indexing movement.
Figure 25:
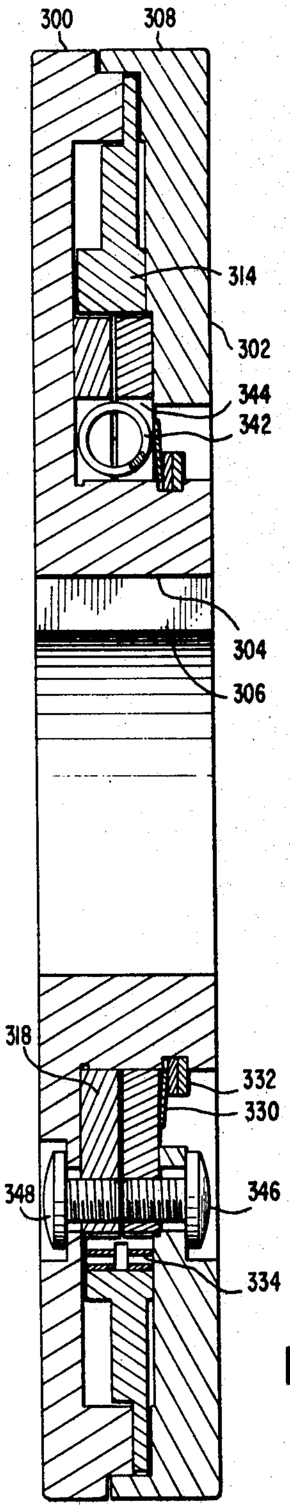
FIGURE 25 is an enlarged sectional view taken along line 25—25 of FIGURE 22.
Figure 26:
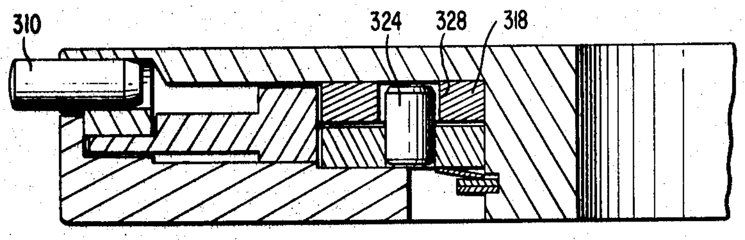
FIGURE 26 is an enlarged sectional view taken along line 26—26 of FIGURE 22.
Figure 27:
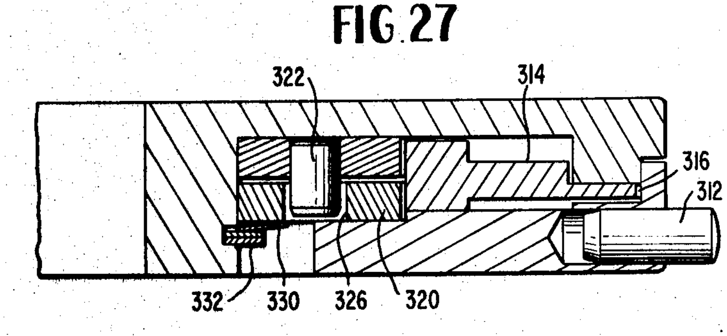
FIGURE 27 is an enlarged sectional view taken along line 27—27 of FIGURE 22.

The magazine rack 58 and the magazine index mechanism 60, as well as a magazine eject arrangement, are shown in FIGS. 18 through 20, inclusive.

The magazines 56, as shown in phantom lines in FIG. 19, are supported on a spindle 364 which in turn is rotatable on a support rod 366. The support rod is carried by a back 368 on the support housing. A movable plate 370 is slidable on the spindle 364 and a spring 372 is provided to bias the stack of magazines outwardly toward end projections 371 on the end of the spindle 364. Normally these projections hold the outermost magazines 56 in a correct location for receiving chips from needle tip 37.

For index purposes, a magazine back pin holding member 374 is provided with a slot 376 and this holding member is secured by suitable screws 377 to a fixed support so as to be stationary. At the other side of the magazine, there is a movable indexing tip 378 on index lever 380, which lever is mostly within index housing 382. The lever 380 is pivoted at pivot pin 384 and includes an adjustable end button 386 which is contacted by actuating solenoid 388. Energization of the solenoid at a selected time causes the tip of the lever 380 to index the cover of the magazine for the purpose of depositing a transistor chip in the magazine after it has been successfully oriented and tested.

A dashpot arrangement including piston 390 and cylinder 392 having a control vent 394 is provided to damp the movement of lever 380.

After a predetermined number of transistor chips have been inserted in the magazine 56, the magazine will be full and the magazine can be automatically ejected from spindle 364 over the end splines 371 onto a wire magazine holder 396, FIG. 19. This holder is secured to the shaft 366 by a bracket 398 and screw 399. The outermost magazine may be ejected from rotatable spindle 364 by rotating the spindle 364 to position splines 371 to match up with the spline slots 306 in the magazine and then spring 372 forces the outermost magazine on the rack 396. Rotation of spindle 364 is accomplished by energizing rotary solenoid 400 which is connected through the linkage shown in FIGURES 20 and 21 to the rear end of spindle 364. This linkage includes a solenoid shaft 402 having a lever 404 clamped thereon, and this lever is pivotably connected with arm 406 which in turn is also pivotably connected at its other end to arm 408. Arm 408 is rigidly secured by welding or the like to a flange 410 of the spindle 364. A spring 412 is connected to the tip of arm 408 and to the housing in order to normally bias the arm 408 and hence, the spindle 364 to magazine holding position. However, on energization of the rotary solenoid 400 the bias of the spring is overcome and through linkages 404, 406 and 408, the spindle 364 is rotated to allow the outermost magazine 56 to be ejected.

*Electrical control circuit for orient testing and chip rotation*

The electrical circuit for controlling the orient solenoids which in turn control the rotation of the needle about its axis as a result of the test conducted at test probe 38 is shown in FIG. 30.

Referring to FIG. 30, the orient probe 38 is shown schematically and it includes, in the embodiment illustrated, three probe wire tips **274*a*, 274*b* and 274*c*. The back of the transistor chip 70 is grounded by ground connection 414 through the needle tip 37**.

Each of the three probe wires **274*a*, 274*b* and 274*c* are connected to control the switching of respective transistors 416, 418 and 420. The transistor 416 controls a gating SCR 422 while transistors 418 and 420 control the firing of and latching of SCR's 424 and 426, respectively. SCR 426 controls the energization of solenoid coil 170*c* for rotating the needle minus 90° from that of its test presentation position. Latching SCR 424 controls the energization of solenoid 170*b* to accomplish plus 90° rotation of the needle tip and the transistor carried thereby. Gating SCR 422 controls the firing of SCR 425 which in turn controls the energization of solenoid 170*a* which is the second plus 90° orientation which on top of the first plus 90° of orientation gives a plus 180° rotation. Cams, including cams 428, 432 and 434, are all on the same cam shaft 430** on the machines to control the timing of the operation. The circuits include the conventional components shown with the usual diodes.

In operation, if the test probe **274*c* indicates a required orientation of minus 90° from the position in which the chip is presented to the probe 38, the transistor 420 will turn off ground and its collector goes high, SCR 426 is fired and latched, solenoid 170*c* is energized projecting the corresponding pin to rotate the needle minus 90°. If probe 274*a* detects an electrode, it energizes the base of transistor 416 turning it off so that the collector goes high, SCR 422 is fired and latched so as to apply potential to point 423. Through the circuit including diode 436, an SCR 424 is fired energizing solenoid 170*b* to rotate the transistor the first 90° of the 180°. At an appropriate time during the rotation of the turret and after the needle has been rotated about its axis plus 90°, cam 432 closes associated cam switch 433 firing SCR 425 and energizing solenoid 170*a*** to rotate the needle tip another 90° making 180° rotation.

If the transistor chip 70 shown in FIG. 31 is transposed in its present position over the orient probe 38, probe wire tip **274*b* will contact electrode 76 completing the circuit to switch transistor 418 off so that its collector goes high and a circuit is completed to fire SCR 424 while diode 436 blocks a circuit to point 423. Firing of SCR 424 energizes solenoid 170*b*** which in turn mechanically causes rotation of the needle plus 90°.

If the transistor chip 70 shown in FIG. 31 is rotated 90° clockwise, none of the electrodes 72, 74 and 76 will be contacted by a probe and thus, the circuit detects nothing, no solenoids are energized and hence, the chip is in its correctly oriented position as randomly presented to the probe 38.

Cams 428 and 434 control switches 429 and 435, respectively, which in turn are opened at the end of the cycle to clear all SCR's and place them in their original condition ready for the orientation testing of the next transistor chip 70 presented to probe 38.

*Electrical control circuit for chip reject control, magazine indexing and eject control*

Figure 29:
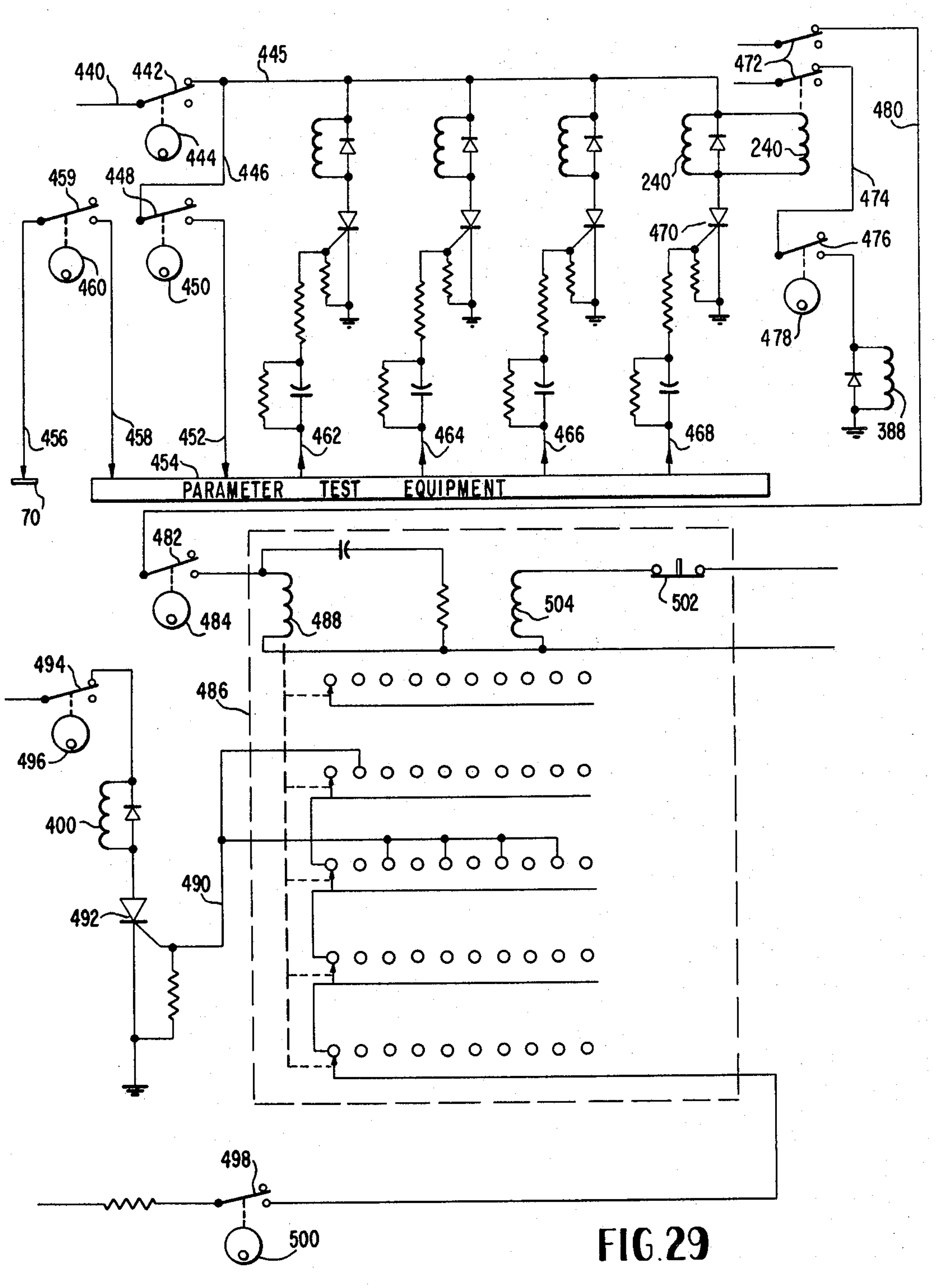
FIGURE 29 is an electrical circuit for operatively controlling chip reject, magazine index and magazine eject of the machine of this invention.

For control of the rejecting of transistors after they are tested for electrical parameters and for control of the magazine advance and magazine ejecting after a predetermined count, a suitable circuit, such as shown in FIG. 29, is provided. Power is applied to line 440 which, under control by a cam controlled SCR clearing switch 442 driven by cam 444, can apply this power to lines 445 and 446. Line 446 is controlled by timing cam switch 448 driven by cam 450 so as to apply power to parameter tester 454 through line 452. A transistor chip 70 is seated in a parameter test probe and its electrodes are contacted so that a signal may be sent over line 456 and into parameter tester through line 458 under control of the cam switch 459 driven by cam 460. The parameter test equipment 454 may be of a commercially available type, such as that furnished by Signetics Corporation under their model SI9000, or any other suitable types.

The parameter test equipment takes the input and provides a number of outputs depending on the parameters tested and whether or not they are up to suitable standards. For example, there may be four outputs, 462, 464, 466 and 468, which in turn control identical circuits so that only one need be described. These circuits may be for each of the reject stations or bins 42, 50, 52 and 54, FIG. 1. For reject station 54, the line 468, for example, leads into and controls the firing of SCR 470 which in turn controls energization of solenoid 240 to apply air to the needle tip for ejecting a transistor chip.

When solenoid 240 is energized there is occasion for reject and the magazine index advance should be inhibited. Normally, however, power applied through switch 472 and line 474 under control of cam switch 476 driven by cam 478 would energize magazine index solenoid 388 unless switch 472 were thrown from the position shown by energization of solenoid 240 which would mean that there was a reject and a chip would not reach the magazine, therefore, there would be no need for the magazine to advance or index. Similarly, the counting of chips deposited in the magazine should be interrupted and this is also accomplished by opening the switch 472. Normally, if no reject is necessary, power through switch 472 in the position shown in FIG. 29 is applied through line 480 and under the control of cam switch 482 driven by cam 484 to a predetermined counter 486 having a count solenoid 488 of the usual type. The predetermined counter may be set for 200 chips so that at the time 200 chips are in the magazine, the magazine is ejected and a new magazine is supplied. With the counter set for 200 chips, as shown in FIG. 29 at the time the 200th chip is counted, the counter energizes line 490 firing SCR 492 which in turn energizes magazine eject solenoid 400 ejecting the magazine if cam control switch 494 is in the position shown when driven by cam 496. The timing of the counter is controlled by cam switch 498 driven by cam 500. The counter may also have a reset coil 504 under the control of manual reset switch 502.

*Operation*

The operation of the machine may be briefly summarized as follows: Transistor chips 70 are fed on chip feed tray 68 one at a time with their electrodes down on the tray, see FIG. 1. Turret 32 including a plurality of needle assemblies 36 is indexed and stops with a needle adjacent the feed tray. Drive mechanism including lever 124, FIG. 3, operates cam 113, FIG. 4, to allow spring 118 to move cam follower 114 radially outward and hence move tip 37 of needle assembly 36 radially outward. Vacuum is applied through vacuum connection 190 and under control of valve member 224 continuously to the needle tip through the passages shown in FIG. 3 in the turret. The transistor chip will be picked up on tip 37 of the needle assembly 36 and the needle assembly may then be retracted during the rotary index movement of the turret. Rotary index movement of the turret is accomplished from drive aggregate 34 and the turret is rotatably indexed 45° at which time the turret enters a dwell period. Thus, the needle, after moving 45° from the feed tray is now at the orient probe 38.

Figure 17:
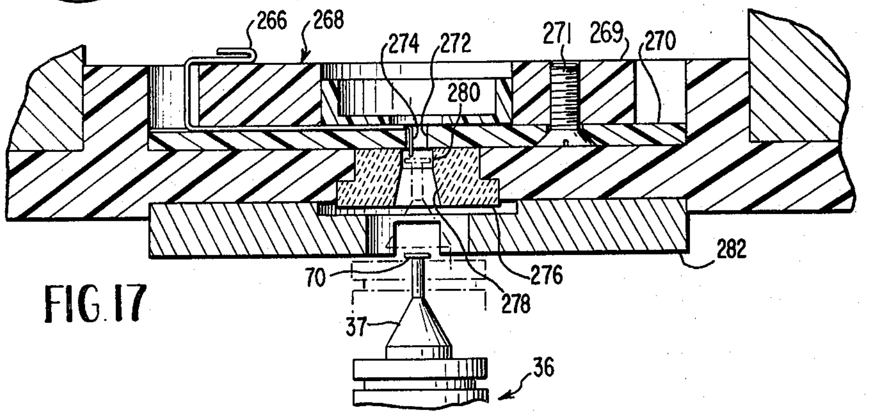
FIGURE 17 is a longitudinal sectional detailed view taken through a section of a test probe.

The same operation repeats for extending the needle tip 37 radially outward under control of cam 113 and transistor chip 70 is carried into probe 38 as shown in FIG. 17 with the electrodes outward so that the electrodes may or may not contact the tips 274 of probe wires, see FIGS. 17, 30 and 31.

As explained with regard to FIGS. 30 and 31 above, if the chip 70 as presented requires rotation in order to assume a reference orientation with regard to the position of the electrodes of all chips in a series, then through the control of electrical circuits one or more of the solenoids 170 may be energized. Energization of selective solenoids 170 will project selectively pins 146, 148 or 174 into the slots 144 of mutilated wheel 136 which, by cooperation with pinion 104 on needle assembly 36, will rotate the needle assembly axially as required. This rotation occurs in two steps, either plus or minus 90° during the first 45° of rotation following the nine o'clock position of the orient test probe and if required an additional 90° during the next 45° of rotation of the turret up to the twelve o'clock position where the first test station 40 is.

At the dwell of the turret when the needle assembly 36 carrying the correctly oriented chip is below electrical test probe 40, the needle is again axially extended as described above into contact with contact wires in the electrical probe 40 and the signals are passed to parameter test equipment 454, FIG. 29, under control of timing cams. If the parameter test is successful, the needle is indexed 45° to a next parameter test position and tested in electrical test probe 44. The operation is repeated twice more through test probes 46, and 48. If any of the electrical tests show deficiency in required electrical parameters of the transistor chips, the chips are rejected into the reject bins 42, 50, 52 or 54 under the control of the parameter test equipment filing SCR 470 energizing solenoid 240, FIG. 29. Solenoid 240 projects cam 234, FIG. 10, to cause valve member 224 to shift and apply air to the tip of the needle as the needle passes through the slot 284 of the reject bin 54, see FIG. 3. If a chip is rejected, the magazine index mechanism 60 does not index magazine 56 and a counter 486 is not advanced one count.

Assuming a transistor chip has passed all its tests, then the needle assembly 36 as it reaches the six o'clock position again moves radially outward and extends the chip into slot 358 of magazine cover 302, see FIG. 28. The magazine index mechanism 60 then indexes the magazine trapping the transistor 70 under the slot 360 and the needle retracts. Indexing of the magazine enters a count in the counter and after the predetermined counter indicates the magazine is full, a magazine eject solenoid 400 is energized to eject the full magazine 56 onto wire 396 and present an empty magazine ready for receiving transistor chips which have been successfully tested and oriented. Between the six o'clock position and the feed tray 68 a fixed cam 242 contacts the air and vacuum control valve member 224 to apply air to the needle tip to clear the needle prior to application of vacuum for the picking up of the next transistor chip on the feed tray 68.

With the machine of this invention very small transistor chips can be handled with a great deal of accuracy due to the precision made parts and the rotary arrangement of the component including the turret and needles all integrated into a unitary concept. The turret includes built-in controls for rotating the needle about its axis reciprocating the needle and applying air vacuum to the needle tip all in a controlled time fashion. The needle can be reciprocated at the same time as rotated. Providing multiple needles in the turret allows multiple operations to be conducted simultaneously. Orientation of the chip and ejection of the chip is accomplished automatically during movement of the turret and not at a separate dwell position thus saving time in operation. All of the test probes are identical so that they can easily be converted from one type to another and are interchangeable except for the probe plates.

The machine can perform many different functions at one time. These functions include picking up a chip from the feed tray by the vacuum needle, testing the chip orientation, orienting the chip, testing the oriented chip for electrical characteristics and possibly rejecting it in four different test and reject stations, loading into a magazine and clearing the needle after loading prior to picking up the next chip. The rotary magazine per se is also unique especially in the way it is indexed and the way the chip is held by trapping it while the needle tip is withdrawn.

While the invention has been particularly shown and described with reference to a preferred embodiment thereof, it will be understood by those skilled in the art that various changes in form and details may be made therein without departing from the spirit and scope of the invention.

What is claimed is:

1. A machine for orienting and testing, miniature chips of semiconductors or the like, of the type including a rotatably indexable turret, means for indexably driving the turret, a plurality of hollow needles carried by the indexable turret, means for axially reciprocating the needles carried by the turret, means for applying vacuum to the hollow needles, an orient probe station positioned adjacent the turret, an electrical test probe station after the orient test probe station in the direction of rotation of the turret, an eject station after the test probe station in the direction of rotation of the turret, the improvements comprising; the needles being radially positioned relative to the axis of the turret, needle rotation control means carried by the turret for controllably rotating said needles about their own axis for index purposes, the orient test probe station, and electrical test probe station and eject station all positioned adjacent the periphery of the turret, a magazine load station adjacent the periphery of the turret after the eject station in the direction of rotation of the turret, and a magazine at the magazine load station for holding chips loaded therein.

2. A machine as in claim 1 wherein the means for axially rotating the needle comprises, a needle carrier with gear teeth thereon slidably and rotatably mounted in the turret, an index disc assembly including a pinion in mesh with the gear teeth of the needle carrier and an index disc for driving the pinion, and selectively actuatable pins stationary with respect to rotation of the turret extendable into cooperation with the index disc to cause index rotation of the disc and hence the needle on rotary movement of the turret.

3. A machine as in claim 2 wherein the means for axially reciprocating the needles comprises a cam carried by the turret, a cam follower engaging the cam and engaging the needle carrier, and means to move the cam relative to the turret to cause such needle reciprocation in timed relationship with the operation of the machine.

4. A machine as in claim 3 further comprising a solenoid carrier supported by the turret but normally held stationary while the turret is rotatably indexed, a plurality of solenoids supported by the carrier, selective ones of the solenoids actuating associated pins extendable into cooperation with the index disc.

5. A machine as in claim 4 further comprising means for selectively applying vacuum or pressure to the hollow needles, the means including valves controlling vacuum or pressure passages in the turret, and solenoids for operating the valves.

6. A machine as in claim 5 wherein the solenoids selectively operate the valves by extending a cam into the path of movement of the valves carried by the turret.

7. A machine as in claim 1 wherein the electrical test probe and the orient test probe station are of generally similar construction and each includes electrical probe contacts cooperating with at least one contact of a chip presented to the probe by the hollow needle, and electrical means connected to the contacts of the orient test probe station dependent upon the relative position of the probe contacts and chip contact to control selective axial rotation of the needle for index purposes.

8. A machine as in claim 7 wherein each probe station includes a probe housing, a probe plate carrying the probe contacts to contact a chip, and a guide plate with a hole of a size to guide the chip to the probe contacts and a tapering entrance to the hole opening wider in the direction of the turret.

9. A machine as in claim 7 wherein the electrical means includes a ground connection to one side of the chip through the needle, and the probe contacts are positioned to contact one chip electrode depending upon the orientation of the chip, and electrical circuits including the contacts energizing solenoids in the turret to control the axial rotation of the needles.

10. A machine as in claim 1 wherein the magazine is indexable on the receipt of each chip and the magazine load station includes a rack for a plurality of magazines and means for indexing the magazine.

11. A machine as in claim 10 further including a counter for counting a predetermined number of chips received by the magazine, and magazine eject means for ejecting a full magazine from a load position and automatically positioning an empty magazine in place of the full magazine.

12. A machine as in claim 11 wherein the magazine eject means is at least partially controlled by the reaching of a predetermined count in the predetermined counter.

13. A machine as in claim 11 further including means for disabling the counter and preventing index of the magazine upon reject of a corresponding rejected chip.

14. A machine as in claim 1 wherein the means for controllably rotating the needles about their axes is operative during rotary movement of the turret in as many as two steps, the first being plus or minus 90° and the second step being plus 90° which may be added onto a first plus 90° rotation.

15. A machine as in claim 1 wherein the magazine is a rotary magazine with an indexable chip holding member for holding chips peripherally beneath a magazine cover.

16. A machine as in claim 1 wherein the orient test probe station includes means for electrically contacting the back and the electrodes of the chip presented thereto, and signalling the orientation of such chip.

17. A circular indexable magazine of chips of semiconductors or the like, the magazine comprising; a magazine back, a magazine cover on the back rotatable with respect thereto, the cover and back defining a cavity therebetween, an annular chip holder in the cavity with teeth in the outer periphery thereof, an opening in the cover for allowing insertion of chips through the cover to be carried in the peripheral tooth spaces by the chip holder, and means cooperating with the back, cover, and chip holder allowing the cover and chip holder to be indexed to trap chips inserted through the cover and retain them under the cover on the chip holder.

18. A circular magazine as in claim 17 wherein the means cooperating with the back, cover, and chip holder includes a pair of transversely split gears rotatable to a limited degree relative to each other, means for securing one gear to the cover and the other gear to the back, a pawl carried by the chip carrier cooperating with ratchet teeth on the split gears to rotate the chip holder on relative rotation of cover and back in one direction, spring means to return the split gears to a normal original position.

19. A circular magazine as in claim 18 wherein the cover includes a peripheral flange overlying peripheral teeth on the chip holder, and the cover includes special shaped slots overlying the chip holder to enable a chip to be inserted into a slot on the end of a needle and then held under edges of the slot when the needle is removed from the position of magazine loading.

References Cited

UNITED STATES PATENTS 3,353,669 11/1967 Broderick ........... 209—73

M. HENSON WOOD, Jr., *Primary Examiner.*

J. P. MULLINS, *Assistant Examiner.*

UNITED STATES PATENT OFFICE
CERTIFICATE OF CORRECTION

Patent No. 3,384,236 May 21, 1968

Howard S. Best et al.

It is certified that error appears in the above identified patent and that said Letters Patent are hereby corrected as shown below:

Column 6, line 41, "dragram" should read -- diagram --; line 61, "proble" should read -- probe --. Column 7, line 44, "carying" should read -- carrying --. Column 12, line 47, after "orient" insert -- test --.

Signed and sealed this 14th day of October 1969

(SEAL)
Attest:

Edward M. Fletcher, Jr.
Attesting Officer

WILLIAM E. SCHUYLER, JR.
Commissioner of Patents